US010231281B2

(12) United States Patent
Jia

(10) Patent No.: US 10,231,281 B2
(45) Date of Patent: *Mar. 12, 2019

(54) MANAGING NEGOTIATION OF EXTENDED IDLE MODE DISCONTINUOUS RECEPTION PARAMETERS BETWEEN A USER EQUIPMENT AND A CORE NETWORK DEVICE

(71) Applicant: AT&T Mobility II LLC, Atlanta, GA (US)

(72) Inventor: Yupeng Jia, Austin, TX (US)

(73) Assignee: AT&T MOBILITY II LLC, Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/363,661

(22) Filed: Nov. 29, 2016

(65) Prior Publication Data

US 2018/0152978 A1    May 31, 2018

(51) Int. Cl.
| | | |
|---|---|---|
| *G01R 31/08* | (2006.01) |
| *H04W 76/28* | (2018.01) |
| *H04W 76/10* | (2018.01) |
| *H04W 60/04* | (2009.01) |

(52) U.S. Cl.
CPC ........... *H04W 76/28* (2018.02); *H04W 76/10* (2018.02); *H04W 60/04* (2013.01)

(58) Field of Classification Search
None
See application file for complete search history.

(56) References Cited

U.S. PATENT DOCUMENTS

| 7,672,660 B2 | 3/2010 | Kim et al. |
| 7,760,676 B2 | 7/2010 | Demirhan et al. |
| 7,801,066 B2 | 9/2010 | Wang et al. |

(Continued)

FOREIGN PATENT DOCUMENTS

| CN | 101111051 A | 1/2008 |
| CN | 102761944 B | 10/2012 |

(Continued)

OTHER PUBLICATIONS

U.S. Appl. No. 15/363,532, filed Nov. 29, 2016, claims 1-20, pp. 41-45.*

(Continued)

*Primary Examiner* — Phuongchau Ba Nguyen
(74) *Attorney, Agent, or Firm* — Amin, Turocy & Watson, LLP

(57) ABSTRACT

The disclosed subject matter provides techniques for managing negotiation of extended idle mode discontinuous reception eDRX parameters between a usr equipment (UE) and core network device of a wireless communication network. In this regard, a method is provided that includes establishing, by a device comprising a processor, a wireless communication link with a network device of a wireless network. The method further includes determining, by the device, based on a determination that an idle mode retry protocol for the device is enabled, a number of times the network device has previously instructed the device to use a network value for an idle mode parameter instead of a device value for the idle mode parameter in association with the device operating in an idle mode.

20 Claims, 11 Drawing Sheets

(56) References Cited

U.S. PATENT DOCUMENTS

| | | |
|---|---|---|
| 7,899,003 B2 | 3/2011 | Xu |
| 7,899,433 B2 | 3/2011 | Lee et al. |
| 7,957,360 B2 | 6/2011 | Suzuki et al. |
| 7,991,436 B2 | 8/2011 | Yanover |
| 8,086,213 B1 | 12/2011 | Wang et al. |
| 8,260,374 B2 | 9/2012 | Wang et al. |
| 8,265,017 B2 | 9/2012 | Robinson et al. |
| 8,265,682 B2 | 9/2012 | Bertrand et al. |
| 8,284,707 B2 | 10/2012 | Choi et al. |
| 8,289,891 B2 | 10/2012 | Ji et al. |
| 8,538,432 B2 | 9/2013 | Lee et al. |
| 8,577,326 B2 | 11/2013 | Bhattacharya |
| 8,599,730 B2 | 12/2013 | Cheng et al. |
| 8,718,029 B1 | 5/2014 | Wong et al. |
| 8,971,933 B2 | 3/2015 | Kitazoe et al. |
| 9,167,617 B2 | 10/2015 | Davies et al. |
| 9,179,410 B2 | 11/2015 | Frye |
| 9,226,335 B1 | 12/2015 | Semersky et al. |
| 9,237,478 B2 | 1/2016 | Vannithamby et al. |
| 9,326,235 B1 | 4/2016 | Wong et al. |
| 2007/0167195 A1 | 7/2007 | Su et al. |
| 2009/0154386 A1 | 6/2009 | So et al. |
| 2009/0196256 A1 | 8/2009 | Digirolamo et al. |
| 2010/0323647 A1 | 12/2010 | Ryu et al. |
| 2013/0294307 A1 | 11/2013 | Johansson et al. |
| 2014/0018085 A1 | 1/2014 | Young et al. |
| 2014/0211676 A1 | 7/2014 | Chhabra |
| 2014/0301373 A1 | 10/2014 | Cili et al. |
| 2015/0029920 A1 | 1/2015 | Hoehne et al. |
| 2016/0192435 A1 | 6/2016 | Gupta et al. |
| 2016/0211986 A1 | 7/2016 | Diachina et al. |
| 2016/0295504 A1* | 10/2016 | Wang .......... H04W 52/02 |
| 2018/0152978 A1 | 5/2018 | Jia |

FOREIGN PATENT DOCUMENTS

| | | |
|---|---|---|
| JP | 2003179539 A | 6/2003 |
| WO | 2005064818 A1 | 7/2005 |
| WO | 2006071096 A1 | 7/2006 |
| WO | 2014042377 A1 | 3/2014 |

OTHER PUBLICATIONS

Li (CN 102761944A), Oct. 31, 2012, pp. 1-23, English Machine Translation.*

Seok et al., "Application driven network capacity adaptation for energy efficient adhoc networks." Personal, Indoor and Mobile Radio Communications, 2003. PIMRC 2003. 14th IEEE Proceedings on. vol. 1. IEEE, 2003 http://citeseerx.ist.psu.edu/viewdoc/download? doi=10.1.1.217.5872&rep=rep1&type=pdf. Retrieved on Sep. 19, 2016, 5 pages.

Kumar et al., "Medium Access Control protocols for ad hoc wireless networks: A survey." Ad Hoc Networks 4.3 (2006): 326358. http://www2.ece.gatech.edu/research/labs/bwn/ee6610/supplements/adhocmac.pdf. Retrieved on Sep. 19, 2016, 33 pages.

Hur et al., "A Hierarchical Powersaving Method of WUSB over WBAN." International Journal of Multimedia and Ubiquitous Engineering 8.3 (2013): 6782. http://citeseerx.ist.psu.edu/viewdoc/download?. Retrieved on Sep. 19, 2016, 16 pages.

Han et al., "Design, realization, and evaluation of DozyAP for powerefficient WiFi tethering." IEEE/ACM Transactions on Networking (TON) 22.5 (2014): 16721685. http://www.cs.wm.edu/~liqun/paper/ton14dozyap.pdf. Retrieved on Sep. 19, 2016, 14 pages.

Kuo, et al., "Power Saving Scheduling Scheme for Internet of Things over LTE/LTE-Advanced Networks," Hindawi Publishing Corporation Mobile Information Systems vol. 2015, Article ID 971538, Received Oct. 1, 2015, 12 pages.

Khan, "Impact of DRX on VoIP Performance and Battery Life in LTE." (2009). http://www.divaportal.org/smash/get/diva2:828296/FULLTEXT01.pdf. Retrieved on Sep. 19, 2016, 63 pages.

Fowler et al., "Analysis of adjustable and fixed DRX mechanism for power saving in LTE/LTEAdvanced." 2012 IEEE International Conference on Communications (ICC). IEEE, 2012. http://www.divaportal.org/smash/get/diva2:575836/FULLTEXT01.pdf. Retrieved on Sep. 19, 2016, 7 pages.

Shin et al., "Energy-delay tradeoff analysis and enhancement in LTE powersaving mechanisms." 2013 IEEE International Conference on Consumer Electronics (ICCE). IEEE, 2013. http://sons.hknu.ac.kr/doc/ICCE_LTE_PSM.pdf. Retrieved on Sep. 19, 2016, 2 pages.

Fowler et al. "Analytical evaluation of extended DRX with additional active cycles for light traffic." Computer Networks 77 (2015): 90102. http://www.divaportal.org/smash/get/diva2:788911/FULLTEXT02. Retrieved on Sep. 19, 2016, 21 pages.

Office Action for U.S. Appl. No. 15/363,532 dated May 15, 2018, 28 pages.

* cited by examiner

MANAGING NEGOTIATION OF EXTENDED IDLE MODE DISCONTINUOUS RECEPTION PARAMETERS BETWEEN A USER EQUIPMENT AND A CORE NETWORK DEVICE

TECHNICAL FIELD

The disclosed subject matter relates to techniques for managing the negotiation of extended idle mode discontinuous reception (eDRX) parameters between a user equipment (UE) and core network device.

BACKGROUND

Under the umbrella of third generation partnership project (3GPP) wireless communication technology standards, radio-access technologies for mobile broadband have evolved effectively to provide connectivity to billions of subscribers and devices. Within this ecosystem, the standardization of a radio technology for massive machine-type communication (MTC) applications is also evolving. The aim is for this technology to provide cost-effective connectivity to billions of "Internet of things" (IoT) devices, supporting low power consumption, the use of low-cost devices, and provision of excellent coverage.

One mechanism used to save user equipment (UE) power in LTE and advanced LTE cellular networks is discontinuous reception (DRX). With DRX, a can be configured to turn at least part of its circuitry off during a DRX period to save power. During the DRX period, the network should not try to contact the UE, so the UE does not need to listen for the paging messages or downlink control channels used by the network to reach the UE. Accordingly, the UE turns off its transmitter and receiver for defined intervals, referred to as DRX periods. Between DRX periods, the UE can turns on its receiver for a short paging period. The initial DRX operating parameters limit the longest possible DRX period to 2.56 seconds. The 3GPP Release 13 specification improves upon the original DRX mode by introducing an extended idle mode DRX (eDRX). With eDRX, the UE and the network can negotiate the eDRX parameters that control the duration of the DRX cycle beyond the previous upper limit of 2.56 to optimize UE power consumption while balancing network signaling needs. However, current techniques employed to negotiate eDRX parameters between the UE and the network impart an unnecessary load on the network.

DETAILED DESCRIPTION

Figure 1:
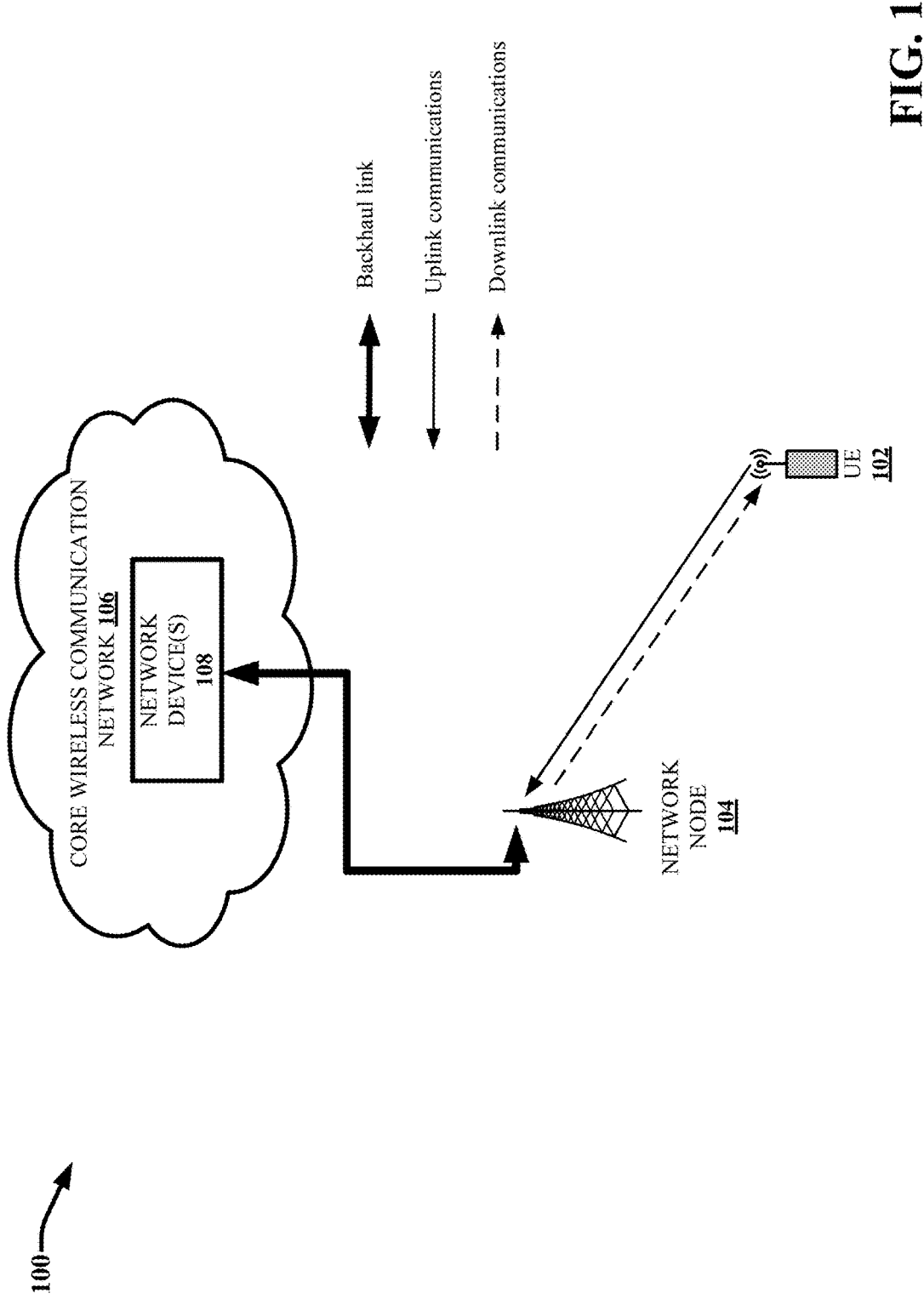
FIG. 1 is an illustration of an example wireless communication system that facilitates managing negotiation of eDRX parameters between a UE and core network device in accordance with various aspects and embodiments of the subject disclosure.

Extended idle mode discontinuous reception (eDRX) is a 3GPP Release 13 feature that allows for reducing device power consumption while being available for mobile terminated data within a certain delay. eDRX allows a UE to extend the duration of respective DRX periods during idle mode beyond a previous DRX period limit of 2.56 seconds up to 43.69 minutes. The 3GPP release 13 also allows a UE and the core network to negotiate eDRX parameters, including the duration of the respective DRX periods. In particular, as described in 3GPP Release 13, in order to enter eDRX mode, the UE shall request the use of eDRX during an attachment procedure or tracking area update (TAU) procedure by including desired eDRX parameters in the attach request or the TAU request. The eDRX parameters include a value for a DRX timer that defines the duration of the DRX periods. For example, this value includes a defined valued selected from a set of defined values that are power of 2, starting from 5.12 seconds (e.g., 5.12 seconds, 10.24 seconds, 20.48 seconds and so on) up to a maximum of 2621.44 seconds (e.g., 43.69 min). The network can authorize a UE to operate using the requested eDRX by responding to the UE attach or TAU request and including eDRX parameters in the response. In particular, as defined in 3GPP Release 13 (e.g., technical specification (TS) 23.682 and TS 24.301), the UE shall only operate using eDRX mode if the network provides eDRX parameters when accepting an attach request or TAU request. Otherwise, the UE shall apply its regular DRX configuration (e.g., wherein the DRX duration is 2.56 seconds or less, as defined in 3GPP TS 23.401 clause 5.13).

In some scenarios, the eDRX parameters provided by the network to the UE (referred to herein as the network eDRX parameters) in an attachment or TAU acceptance response are different from the eDRX parameters requested by the UE in the attach/TAU request (referred to herein as the UE eDRX parameters). For example, a UE may be configured to request a default maximum DRX period (e.g., 43.69 minutes) in order to conserve power. However, based on signal scheduling constraints, the network may determine that the UE should not apply the requested UE DRX timer but apply shorter DRX timer (e.g., about 30 minutes). Accordingly, in some scenarios, the network attachment or TAU acceptance response can authorize the UE to operate using eDRX but direct the UE to employ network defined eDRX parameters that are different from the UE requested eDRX parameters.

The 3GPP specification requires the UE to always honor the network provided eDRX parameters, even if they are different that the eDRX parameters requested by the UE. However, the 3GPP specification only requires the UE apply the network provided eDRX parameters until the next attach/TAU event. In particular, the 3GPP specification requires the UE to include eDRX parameters in each attach or TAU procedure if the UE wishes to use eDRX mode, regardless as to whether the UE was previously using eDRX mode. As with the initial attach/TAU request, as defined in the 3GPP specification, the UE and the core network can negotiate the eDRX parameters in each subsequent attach/TAU request, even if the previous negotiation resulted in the network providing different eDRX parameters than that requested by UE. For example, in every subsequent attach/TAU request sent by the UE, if the UE desires to operate using eDRX, the UE can include UE desired eDRX parameters in the attach/TAU request, even if the network previously denied usage of the UE desired eDRX parameters and directed the UE to use different network eDRX parameters. The 3GPP specification doesn't define how to manage the negotiation of eDRX parameters between UE and the core network. As a result, in many scenarios, there can be a continuous deadlock wherein the UE continuously requests preferred UE eDRX parameters in each attach/TAU request and the network continuously responds with network eDRX parameters that are different from the preferred UE eDRX parameters. This type of deadlock scenario causes unnecessary strain on the network which can be exponentially exacerbated as the number of devices the network regularly negotiates eDRX parameters with grows.

The subject disclosure is directed to computer processing systems, computer-implemented methods, apparatus and/or computer program products that facilitate managing negotiation of eDRX parameters between a UE and core network device. In particular, the subject disclosure describes a mechanism that involves deploying an eDRX retry protocol at the UE. The proposed eDRX retry protocol provides a solution to guide the UE/chipset to honor the network provided eDRX parameters after reaching the maximum number of attempts to negotiate UE preferred eDRX parameters, referred to herein as a "retry" attempt. With the subject UE based eDRX retry protocol, the network can continue to control eDRX parameters employed by respective UEs serviced by the network. Thus, the network can continue to optimize network provided eDRX parameters in view of both current network and current device requirements. At the same time, the network processing load associated with determining whether to authorize UE requested eDRX parameters in view of network logistics will be lowered. For example, after the maximum number of retry attempts is reached, the UE can be configured to stop requesting UE preferred eDRX parameters in attachment and TAU requests. The UE can simply include the previously provided network eDRX parameters in the attachment and TAU requests. Thus the network will not need to re-evaluate the UE requested eDRX parameters and directly respond to the attachment or TAU request with the requested network eDRX parameters, (which the network had previously authorized the UE to employ), thereby reducing data processing and power consumption by the network.

In addition, the subject retry mechanism allows the network to control the eDRX retry protocol employed by the UE based on network load. For example, the network can control enabling and disabling the retry protocol as well as the maximum number off retry attempts allowed. In some embodiments, the eDRX retry protocol can be implemented on the network provided/configured subscriber identity module (SIM) card or universal integrated circuit card (UICC) of the UE. According to these embodiments, the network can control the eDRX retry protocol using over the air (OTA) messaging protocol. From UE side, the UE will begin using network preferred eDRX parameters after a certain number of retry attempts. The UE can further log information regarding network preferred eDRX parameters. This logged information can be sent to and employed by chipset vendors or device vendors to analyze and optimize their design for certain applications.

In one or more embodiments, a method is provided that includes establishing, by a device comprising a processor, a wireless communication link with a network device of a wireless network. The method further includes determining, by the device, based on a determination that an idle mode retry protocol for the device is enabled, a number of times the network device has previously instructed the device to use a network value for an idle mode parameter instead of a device value for the idle mode parameter in association with the device operating in an idle mode. In some implementations the method can further include, in response to a determination that the number of times does not exceed a threshold retry number, sending, by the device to the network device, a request to use the device value for the idle mode parameter in association with the device operating in the idle mode. In an aspect, the sending the request comprises sending an attachment message to the network device via the wireless communication link, and wherein the attachment request comprises the device value for the idle mode parameter. In another aspect, the sending the request comprises sending a tracking area update message to the network device via the wireless communication link, and wherein the tracking area update message comprises the device value for the idle mode parameter.

In other implementations, the method can further include, in response a determination that the number of times exceeds a threshold retry number, sending, by the device to the network device, a request to use the network value for the idle mode parameter in association with the device operating in the idle mode. In accordance with various embodiments, the network value for the idle mode parameter was previously received by the device from the network device in response to a previous request, sent by the device to the network device, for authorization to use the device value for the idle mode parameter in association with the device operating in the idle mode, and wherein the device previously employed the network value for the idle mode parameter in association with the device operating in the idle mode.

In another embodiment, an integrated circuit card device is provided that comprises a processor, and a memory that stores executable instructions that, when executed by the processor, facilitate performance of operations. These operations can comprise, based on a determination that an idle mode retry protocol is enabled, determining a number of times a device, operatively coupled to the integrated circuit card device, was previously instructed by a network device of a wireless communication network to use a network value for an idle mode parameter instead of a device value for the idle mode parameter in association with the device operating in an idle mode. These operations can further comprise, directing the device to send a first request to the network device requesting usage of the device value in association with the operating in the idle mode based on the number being less than a threshold retry number, and directing the device to send a second request to the network device requesting usage of the network value in association with the operating in the idle mode based on the number being greater than or equal to a threshold retry number. In some embodiments, the integrated circuit card device is a SIM card of the device. In other embodiments, the integrated circuit card device is a UICC of the device.

In yet another embodiment a machine-readable storage medium, comprising executable instructions that, when executed by a processor of a device, facilitate performance of operations. These operations can include determining a number of times the device was previously instructed by a network device of a wireless communication network to use a network timer value for a discontinuous reception period of and idle mode instead of a device timer value for the discontinuous reception period in association with the device operating in the idle mode. The operations further comprise, sending a first request to the network device requesting usage of the device timer value in association with the device operating in the idle mode based on the number being less than a threshold retry number. In various implementations, the operations can further comprise, sending a second request to the network device requesting usage of the network timer value in association with the device operating in the idle mode based on the number being less greater than or equal to the threshold retry number.

The subject disclosure is now described with reference to the drawings, wherein like reference numerals are used to refer to like elements throughout. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings. In the following description, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

FIG. 1 is an illustration of an example wireless communication system 100 that facilitates managing negotiation of eDRX parameters between a UE and core network device in accordance with various aspects and embodiments of the subject disclosure. Aspects of the systems, apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described.

The wireless communication system 100 can be or include various types of disparate networks, including but not limited to: cellular networks, femto networks, picocell networks, microcell networks, internet protocol (IP) networks Wi-Fi service networks, broadband service network, enterprise networks, cloud based networks, and the like. System 100 can comprise one or more UEs 102, a network node 104 and a core wireless communication network 106. It should be appreciated that a single UE 102 is depicted for exemplary purposes and that any number of UEs can be included in system 100. The UE 102 can include a variety of different mobile and stationary device types that can be configured to operate using eDRX mode and the subject eDRX retry protocol. For example, the UE 102 can include but is not limited to: a cellular phone, a smartphone, a tablet computer, a wearable device, a virtual reality (VR) device, a heads-up display (HUD) device, and the like. In various exemplary embodiments, the UE 102 can be configured with MTC or machine to machine (M2M) capabilities. In particular, eDRX will have a strong impact on MTC devices (e.g., Category-M1 devices (Cat-M1), Cat-M2 devices, narrowband (NB)-IoT devices, Cat-0 devices, Cat-1 devices and the like). For example, the UE 102 can be or include metering devices, implantable medical device (IMDs), sensor and/or control devices associated with home automation systems, tracking devices, point of sale devices (e.g., vending, machines), security devices (e.g., associated with surveillance systems, homes security, access control, etc.), and the like. The terms MTC and M2M are used herein interchanged. A UE that is configured to perform one or more MTC functionalities is referred to herein as an MTC device.

The UE 102 can be configured to communicate with the core wireless communication network 106, and more particularly one or more network devices 108 of the core wireless communication network 106, using a communication link established between the UE 102 and a network node 104 of the wireless communication network. The network node 104 can be connected to the core wireless communication network 106 (or one or more network devices 108 of the core wireless communication network 106) via one or more backhaul links (indicated by the thick arrow line). For example, the one or more backhaul links can include wired link components, such as but not limited to: like a T1/E1 phone line, a digital subscriber line (DSL) (e.g., either synchronous or asynchronous), an asymmetric DSL (ADSL), an optical fiber backbone, a coaxial cable, and the like. The one or more backhaul links can also include wireless link components, such as but not limited to, line-of-sight (LOS) or non-LOS links which can include terrestrial air-interfaces or deep space links (e.g., satellite communication links for navigation). The thin solid arrow line from the UE 102 to the network node 104 represents uplink communications and the thin dashed arrow line from the network node 104 to the UE 102 represents downlink communications. Communication links between a UE and a network access point device, such as network node 104, are referred to herein as machine-to-network (M2N) communication links. In some implementations, the UE 102 can be configured to communicate with one or more other UEs another using a machine-to-machine (M2M) link. Further, in some implementations, a UE 102 can serve as a network access point device to other UEs via which the other UEs can communicate with the network node 104.

The non-limiting term network node (or radio network node) is used herein to refer to any type of network node serving a UE 102 and/or connected to other network node, network element, or another network node from which the UE 102 can receive a radio signal. Examples of network nodes (e.g., network node 104) can include but are not limited to: NodeB devices, base station (BS) devices, access point (AP) devices, and radio access network (RAN) devices. The network node 104 can also include multi-standard radio (MSR) radio node devices, including but not limited to: an MSR BS, an eNode B, a network controller, a radio network controller (RNC), a base station controller (BSC), a relay, a donor node controlling relay, a base transceiver station (BTS), a transmission point, a transmission nodes, an RRU, an RRH, nodes in distributed antenna system (DAS), and the like.

The wireless communication system 100 can employ various wireless communication technologies and modulation schemes to facilitate wireless radio communications between devices (e.g., between UEs 102 and between UEs 102 and the network node 104, between the network node 104 and one or more network devices 108, etc.). For example, the UEs 102 can be configured to communicate with the network node 104, and vice versa using various wireless communication technologies, including but not limited to: Universal Mobile Telecommunications System (UMTS) technologies, LTE technologies, advanced LTE technologies (including voice over LTE or VoLTE), narrowband IoT (NB-IoT), Code Division Multiple Access (CDMA) technologies, Time Division Multiple Access (TDMA) technologies, Orthogonal Frequency Division Multiplexing (OFDN) technologies, Filter Bank Multicarrier (FBMC) technologies, Wireless Fidelity (Wi-Fi) technologies, Worldwide Interoperability for Microwave Access (WiMAX) technologies, General Packet Radio Service (GPRS) technologies, Enhanced GPRS, technologies, Third Generation Partnership Project (3GPP) technologies, Fourth Generation Partnership Project (4GPP) technologies, Fifth Generation Partnership Project (5GPP) technologies, Ultra Mobile Broadband (UMB) technologies, High Speed Packet Access (HSPA) technologies, Evolved High Speed Packet Access (HSPA+), High-Speed Downlink Packet Access (HSDPA) technologies, High-Speed Uplink Packet Access (HSUPA) technologies, ZIGBEE® technologies, or another IEEE 802.XX technology. Additionally, substantially all aspects disclosed herein can be exploited in legacy telecommunication technologies. In some embodiments, the UEs can be configured to communicate with one another (e.g., via M2M links) using suitable local area network (LAN) or personal area network (PAN) communication technologies and configured to communicate with the network node 104 using suitable WAN communication technologies. For example, in one or more embodiments, the UEs 102 can be configured to communicate with one another using BLUETOOTH®, BLUETOOTH® low energy (BLE), near field communication (NFC), Wi-Fi protocol, ZIGBEE®, RF4CE, WirelessHART, 6LoWPAN, Z-Wave, ANT, and the like. The one or more UEs 102 can be further configured to communicate with the network node 104 using one or more of the radio access network (RAN) technologies listed above (e.g., LTE, VoLTE, UMTS, etc.).

The core wireless communication network 106 can include various network devices 108 that facilitate providing wireless communication services to the UEs 102 via the network node 104 and/or various additional network devices (not shown). For example, the one or more network devices 108 of the core wireless communication network 106 can include but are not limited to: mobile switching center (MSCs) devices, a home location register (HLR) device, a visitor location register (VLR) device, authentication center (AUC) devices, provisioning servers, billing servers, operation and support system (OSS) devices, short message service center (SMSC) devices, and many other elements. In some implementations, the one or more network devices 108 includes a mobility management entity (MME) device. For example, the system architecture evolution (SAE) is the core network architecture of 3GPP's LTE wireless communication standard. In accordance with SAE, the MME is the key control-node for the LTE access-network. The MME is involved in the bearer activation/deactivation process and is also responsible for choosing the serving gateway (SGW) for a UE at the initial attach, the TAU procedure, and at time of intra-LTE handover involving core network (CN) node relocation. The MME is also responsible for idle mode UE paging and tagging procedure including retransmissions. In various embodiments, the MME can also be configured to control eDRX parameter negotiation between the UE and the core wireless communication network 106 in accordance with various aspects and embodiments disclosed herein.

In accordance with various aspects and embodiments described herein, system 100 can be configured to facilitate managing eDRX parameter negotiation between the UE 102 and the core wireless communication network 106 that provides at least some wireless communication services to the UE via an M2N connection between the UE 102 and the network node 104. In one or more embodiments, the UE 102 is configured to operate using eDRX mode.

Figure 2:
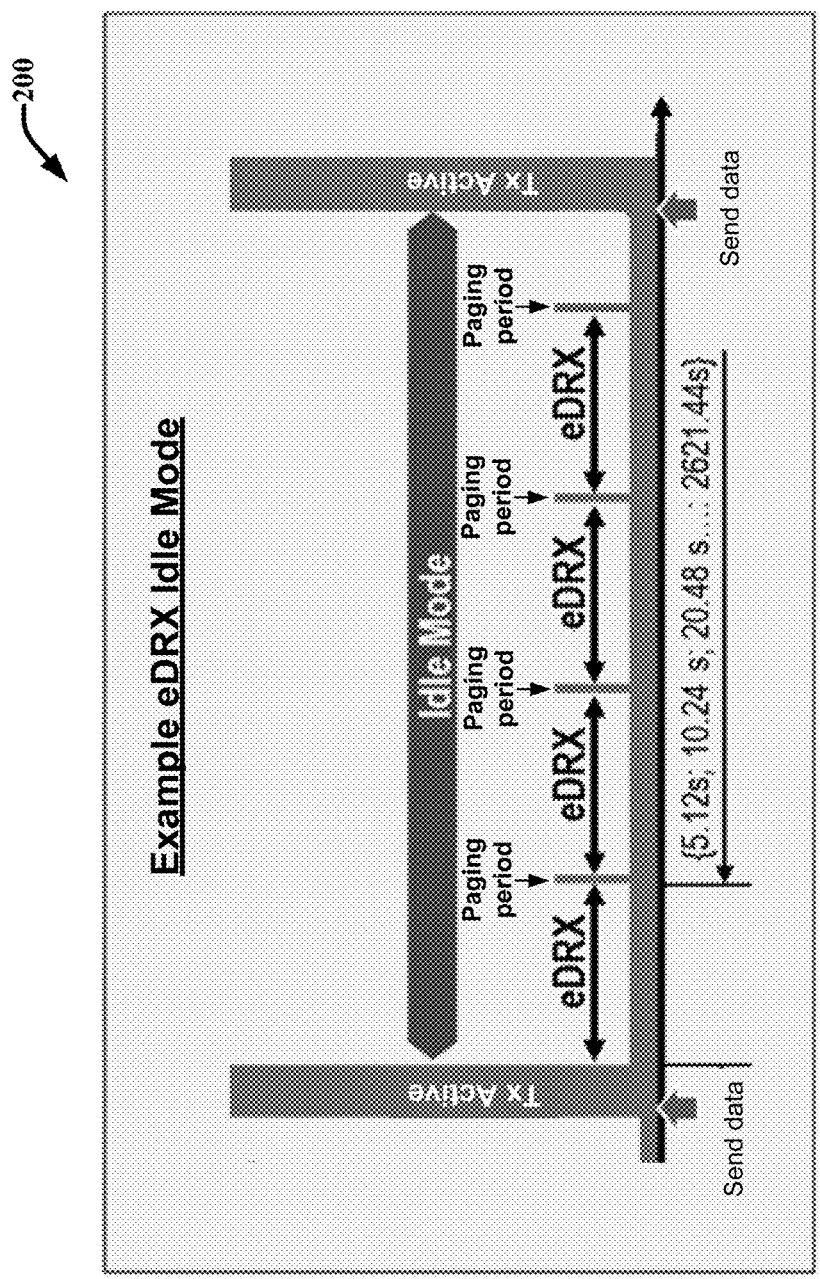
FIG. 2 provides a graphical illustration demonstrating principles of eDRX in accordance with various aspects and embodiments of the subject disclosure.

FIG. 2 provides a graphical illustration 200 demonstrating principles of eDRX in accordance with various aspects and embodiments of the subject disclosure. The eDRX mode is an idle mode between transmission events wherein the UE turns off its transmitter and receiver for defined intervals. These defined intervals are referred to herein as DRX periods when they are 2.56 seconds or less and eDRX periods when they are greater than 2.56 seconds. For example, the initial DRX operating parameters limit the longest possible DRX period to 2.56 seconds. The 3GPP Release 13 specification improves upon the original DRX mode with eDRX mode wherein the eDRX periods can range from 5.12 seconds up to a maximum of 2621.44 seconds (e.g., 43.69 min). An eDRX parameter referred to herein as the eDRX timer controls the duration of the eDRX periods. According to the 3GPP specification Release 13, the eDRX timer can be a defined valued selected from a set of defined values that are power of 2, starting from 5.12 seconds up to a maximum of 2621.44 seconds (e.g., 5.12 seconds, 10.24 seconds, 20.48 . . . 2621.44 seconds). Between eDRX periods, the UE temporarily UE turns on its receiver for a short paging period to listen for the paging messages or downlink control channels used by the network to reach the UE. For example, a normal LTE paging period is 1.28 seconds. In some implementations, the UE alternates between activating and deactivating its receiver over the duration of the paging period. In other implementations, the UE can maintain activation of its receiver over the duration of the paging period. In addition to providing DRX periods that can range from about 5 seconds to about 45 minutes, with eDRX, the UE and the network can negotiate the eDRX parameters that control the eDRX operations of the UE.

Figure 3:
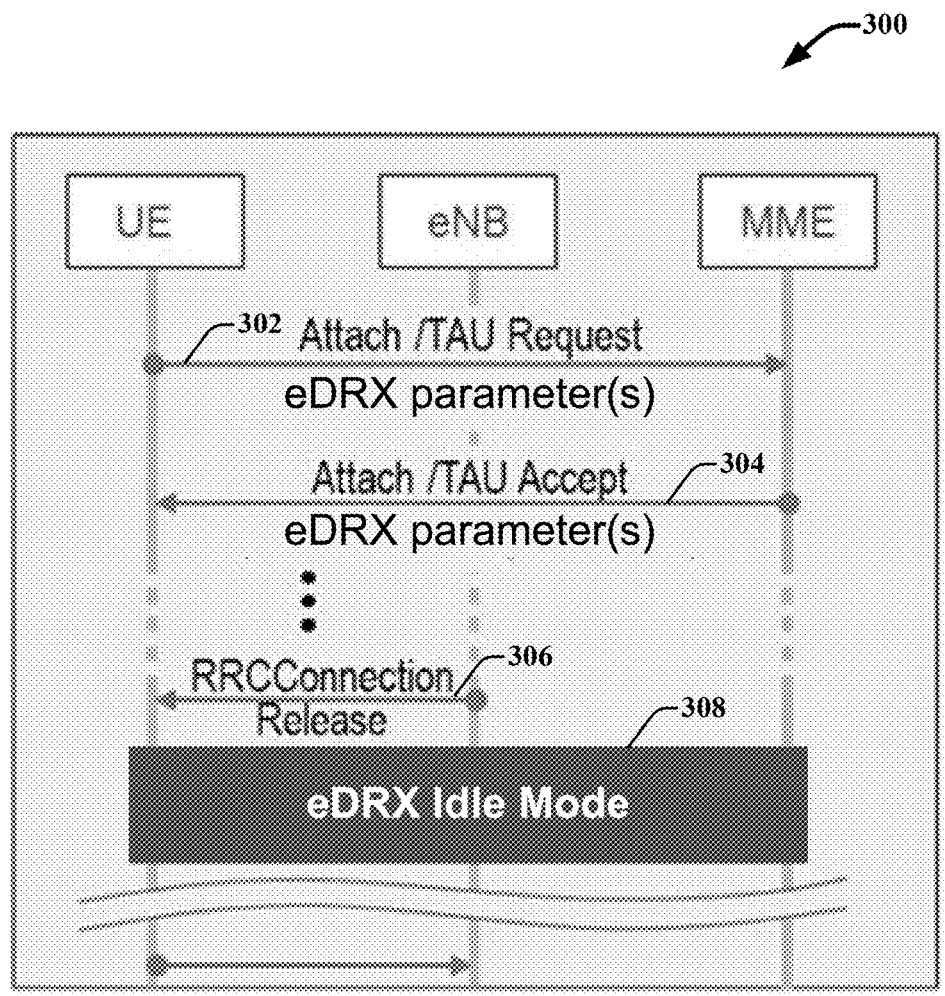
FIG. 3 provides a signaling diagram demonstrating a procedure for negotiating eDRX parameters between a UE and a core network device in accordance with various aspects and embodiments of the subject disclosure.

For example, FIG. 3 provides a signaling diagram 300 demonstrating a procedure for negotiating eDRX parameters between a UE and a core network device in accordance with various aspects and embodiments of the subject disclosure. In the embodiment shown, the core network device includes an MME device. An eNodeB (eNB) serves as the network node (e.g., network node 104) that communicatively connects the UE with the MME.

As described in 3GPP Release 13, in order to enter eDRX mode, the UE shall request the use of eDRX during an attachment procedure or tracking area update (TAU) procedure by including eDRX parameters in the attach request or the TAU request, as shown in signaling event 302. In some implementations, these eDRX parameters can include UE eDRX parameter values that are desired or preferred by the UE. For example, the UE preferred eDRX parameter values can include default UE eDRX parameters values programmed into the UE. In another example, the UE preferred eDRX parameter values can include eDRX parameter values determined by the UE based on various operations of the UE. In other implementations, as described in greater detail infra, the eDRX parameter values provided by the UE in the attach/TAU request will include previously provided network eDRX parameter values if the UE has reached the maximum amount of eDRX negotiation retries. In various embodiments, the eDRX parameters include an eDRX timer value. For example, the eDRX timer value can include a defined timer value selected from a set of defined time values (e.g., (e.g., 5.12 seconds, 10.24 seconds, 20.48 . . . 2621.44 seconds). In some embodiments, the UE and the core network can also negotiate other eDRX parameters including but not limited to: the number of eDRX periods between transmission events (e.g., the total duration of the idle period), the duration of the paging period, and the receiver activating schedule during the paging period.

The network can authorize a UE to operate using eDRX mode by responding to the UE attach or TAU request and including eDRX parameter values in the response, as shown in signaling event 304. The UE then disconnects from the eNB as shown in signaling event 306 (e.g., via a radio resource control (RCC) connection release) and begins operating in the eDRX idle mode 308 according to the eDRX parameter values received from the MME in the attach/TAU accept message. In particular, as defined in 3GPP Release 13 (e.g., technical specification (TS) 23.682 and TS 24.301), the UE shall only operate using eDRX mode if the network provides eDRX parameters when accepting an attach request or TAU request. Otherwise, the UE shall apply its regular DRX configuration (e.g., wherein the DRX duration is 2.56 seconds or less, as defined in 3GPP TS 23.401 clause 5.13).

With reference to FIGS. 1, 2 and 3, in some scenarios, the network eDRX parameter values provided to the UE 102 by the network device (e.g., a network device 108, such as an MME device) in an attachment or TAU acceptance response (e.g., signaling event 304) are different from the eDRX parameter values requested by the UE in the attach/TAU request. The 3GPP specification requires the UE 102 to always honor the network provided eDRX parameters, even if they are different that the eDRX parameters requested by the UE. However, the 3GPP specification only requires the UE 102 apply the network provided eDRX parameters until the next attach/TAU event. For example, according to the 3GPP specification, in every subsequent attach/TAU request sent by the UE 102, if the UE desires to operate using eDRX, the UE 102 can include UE desired eDRX parameters in the attach/TAU request, even if the network previously denied usage of the UE desired eDRX parameters and directed the UE to use different network eDRX parameters. The 3GPP specification does not define how to manage the negotiation of eDRX parameters between UE and the core network. As a result, in many scenarios, there can be a continuous deadlock wherein the UE continuously requests preferred UE eDRX parameters in each attach/TAU request and the network continuously responds with network eDRX parameters that are different from the preferred UE eDRX parameters. This type of deadlock scenario causes unnecessary strain on the network, which can be exponentially exacerbated as the number of devices the network regularly negotiates eDRX parameters with grows.

In order to mitigate the aforementioned deadlock scenario, in accordance with various embodiments of the subject disclosure, the UE 102 can further be configured with eDRX retry control functionality. The eDRX retry control functionality provides an eDRX retry protocol that when executed by a processor of the UE 102, controls the maximum number of times (referred to herein as N-max) the UE 102 can negotiate UE desired eDRX parameters with the core wireless communication network 106, (e.g., via a network device 108 of the core wireless communication network 106, such as an MME device), after the network has previously instructed the UE 102 to use network eDRX parameters that are different from the UE requested eDRX parameters. For example, in accordance with the eDRX retry control protocol, the UE 102 can track the number of times N the UE requests eDRX parameters in attach and TAU procedures yet is directed by the network 106 (e.g., a network device 108 of the core wireless communication network 106, such as an MME device) to employ network eDRX parameters that are different from the UE requested eDRX parameters. In association with each new attach or TAU procedure, based on the eDRX retry control protocol, the UE 102 can determine whether the number of times N, (that the UE was directed by the core wireless communication network 106 to employ network eDRX parameters after requesting different UE eDRX parameters), is greater than or equal to N-max (the maximum retry amount). If N is not greater than or equal to N-max, then the UE 102 can include its preferred UE eDRX parameters in the attach or TAU request.

However, if N is greater than or equal to N-max, based on the retry protocol, the UE can be configured to include the previously provided network eDRX parameters in the attach or TAU request. As a result, in response to reception of the attach or TAU request, the core wireless communication network 106 (e.g., a network device 108 of the core wireless communication network 106, such as an MME device) will not need to determine whether the network should authorize the UE to apply its requested UE eDRX parameters. The network will merely see the UE is requesting usage of eDRX parameters that have already been authorized by the network, skip the negotiation process, and direct the UE to employ the requested network eDRX parameters in the networks attach accept or TAU accept message. The UE 102 can also continue to provide the network eDRX parameters in each subsequent attach or TAU request if the UE desires to operate using eDRX unless the UE is power cycled, re-booted, reset, enters and exits airplane mode or the like, which can result in setting N back to its default value (e.g., zero).

In addition, in some embodiments, the core wireless communication network 106 can control the eDRX retry protocol employed by the UE based on network load, signal scheduling constraints, UE power and service requirements, and other possible factors. For example, the network can control enabling and disabling the eDRX retry protocol on the UE as well as the maximum number off retry attempts allowed (N-max). In another example, the core wireless communication network 106 can reset the number of UE eDRX retry negotiation attempts (N). In some embodiments, the eDRX retry protocol can be implemented on the network provided/configured subscriber identity module (SIM) card or universal integrated circuit card (UICC) of the UE. According to these embodiments, the core wireless communication network 106 can control the eDRX retry protocol of the UE using over the air (OTA) messaging protocol. For example, the UE can include a SIM card or UICC that has been programmed to include the subject eDRX retry control functionality. In one implementation, the eDRX retry control functionality can include an eDRX retry flag that can be set to one of two possible values, wherein a first value (e.g., one) can enable the eDRX retry functionality and a second value (e.g., zero) can disable the eDRX retry functionality. The core wireless communication network 106 can further control enablement and disablement of the eDRX retry functionality of the UE 102 by sending the UE an OTA message, via a communication link established between the network node 104 and the UE 102, that directs the UE to set the retry flag to either the first value or the second value. In another implementation, the eDRX retry control protocol on the UE SIM/UICC can define a value for N-max. The core wireless communication network 106 can also set the value for N-max using an OTA message sent to the UE 102.

Figure 4:
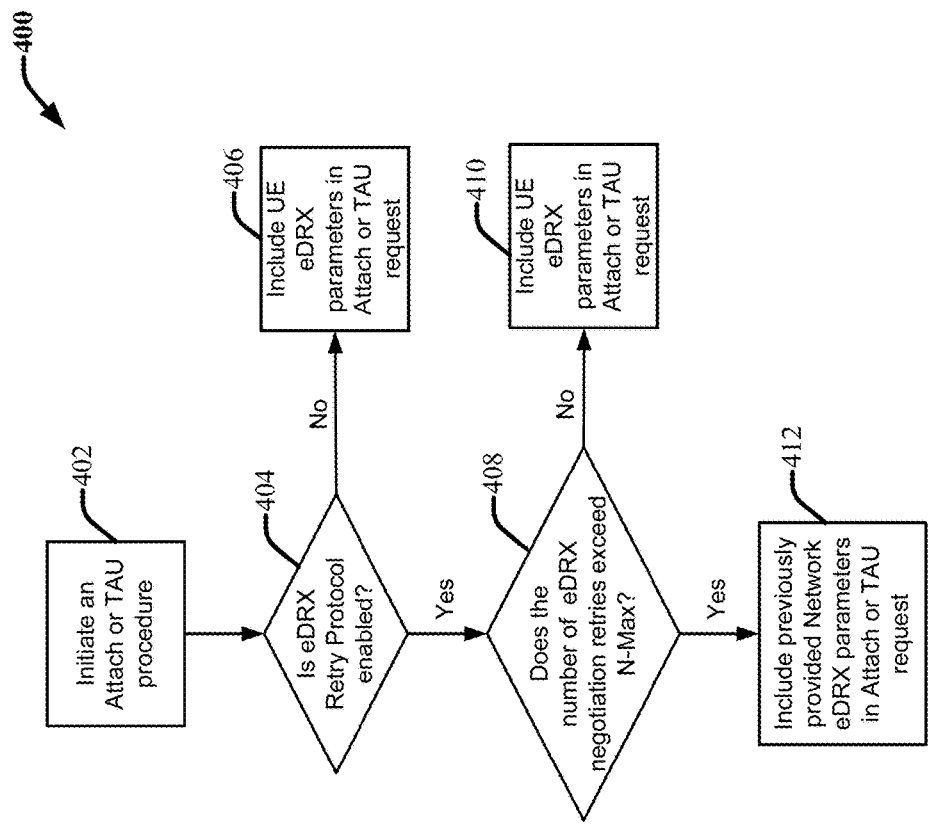
FIG. 4 provides a flow diagram of an example method for managing negotiation of eDRX parameters between a UE and core network device in accordance with various aspects and embodiments of the subject disclosure.

FIG. 4 provides a flow diagram of an example method 400 for managing negotiation of eDRX parameters between a UE and core network device in accordance with various aspects and embodiments of the subject disclosure. In one or more embodiments, method 400 is performed by a UE (e.g., UE 102) in association with operating in a wireless communication network (e.g., system 100). Repetitive description of like elements employed in respective embodiments is omitted for sake of brevity.

At 402, the UE initiates an attach or TAU procedure 402. For example, the UE can activate its transmitter and receiver and establish a wireless communication link with a network node (e.g., network node 104) of a wireless communication network that the UE is subscribed to or otherwise authorized to connect to. In association with initiating the attach or TAU procedure, at 404, the UE determines whether an eDRX retry protocol functionality of the UE is enabled. For example, the UE can check to see whether an eDRX retry flag of the UE is set to an enabled value (e.g., one) or a disabled value (e.g., zero). If the eDRX retry protocol is disabled, then the UE can include UE preferred eDRX parameters in the attach or TAU request, as indicated at 406. If however the eDRX retry protocol is enabled, then at 408, the UE determines whether the number of eDRX negotiation retries (N) exceeds N-max (the maximum number of eDRX negotiation retries the UE is authorized to perform). If at 408, N does not exceed N-max, then the UE can include UE preferred eDRX parameters in the attach or TAU request, as indicated at 410. If however N does exceed N-max, then at 412, the UE will include the previously provided network eDRX parameters in the attach or TAU request.

Figure 5:
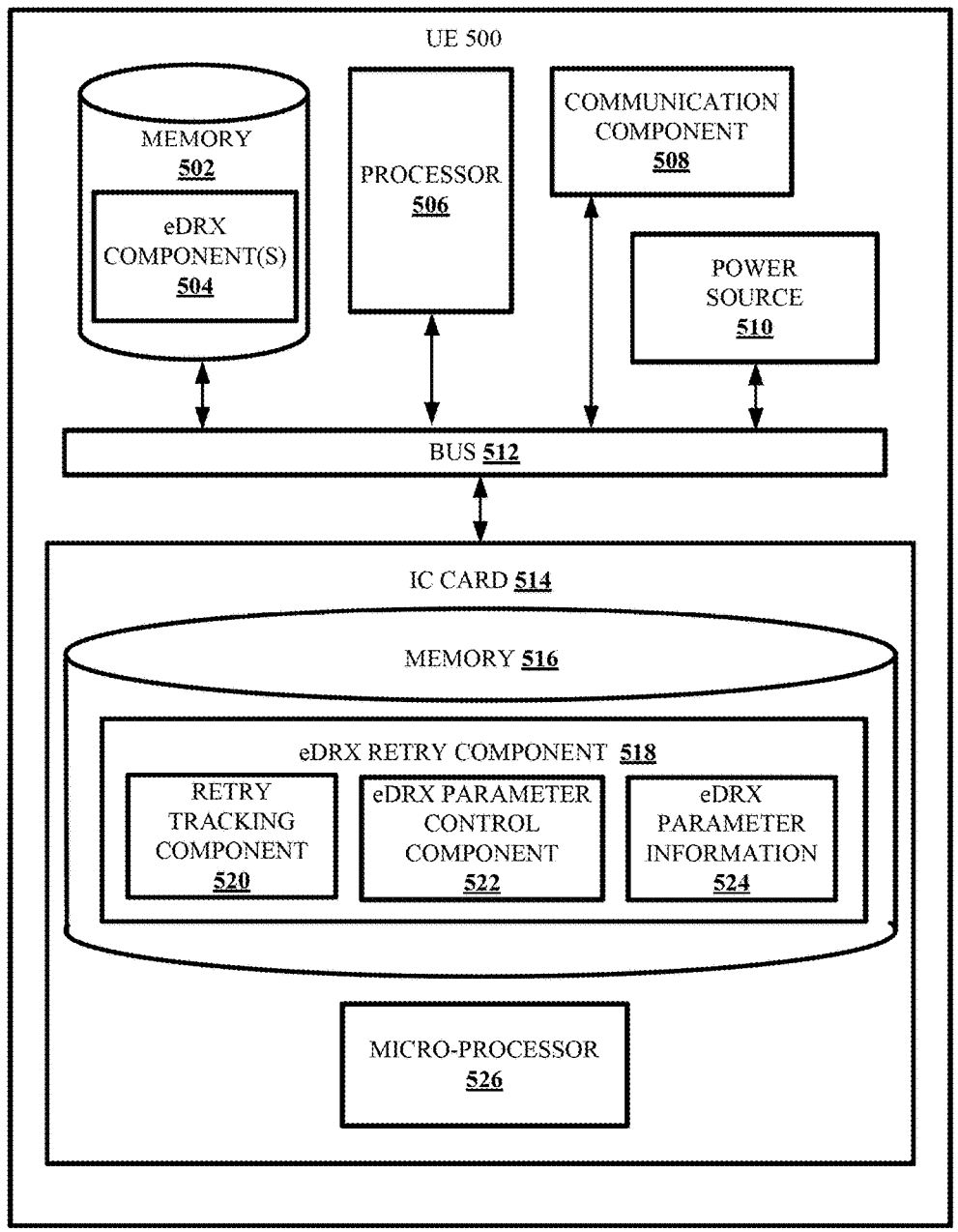
FIG. 5 presents an example UE configured to employ an eDRX retry protocol in association with negotiating eDRX parameters between the UE and the network in accordance with various aspects and embodiments of the subject disclosure.

FIG. 5 presents an example UE 500 configured to employ an eDRX retry protocol in association with negotiating eDRX parameters between the UE and the network in accordance with various aspects and embodiments of the subject disclosure. In various embodiments, the UE 102 of system 100 can be or include UE 500, or vice versa. Repetitive description of like elements employed in respective embodiments is omitted for sake of brevity.

The UE can include memory 502 configured to store computer executable components and instructions. For example, in various embodiments, these computer executable components and instructions can include one or more eDRX components 504. The one or more eDRX components 504 can include information and instructions that control one or more defined eDRX operations of the UE. For example, the eDRX components 504 can include information and instructions regarding when the UE should employ eDRX mode. In another example, the eDRX components 504 can include information and instructions that define preferred or default UE eDRX parameter values, such as a preferred eDRX timer value for the eDRX period, a total duration for the idle period, timer values associated with the paging period, and the like. In another example, the eDRX components 504 can include information and instructions that control how the UE can execute eDRX mode, such as instructions regarding how to request eDRX mode in an attach or TAU request, and how to enter into eDRX mode based on reception of attach or TAU acceptance messages including network eDRX parameters. The UE 500 can also include a processor 506 to facilitate operation of the instructions (e.g., the computer executable components and instructions) by the UE (e.g., the one or more eDRX components 504). The UE 500 further includes a communication component 508, a power source 510, an integrated circuit (IC) card 514 and a device bus 512. The device bus 512 can couple the various components of the UE 500 including, but not limited to, the memory 502, the processor 506, the communication component 508, the power source 510, and the IC card 514. Examples of said processor 506 and memory 502, as well as other suitable computer or computing-based elements that can be employed by the UE, can be found with reference to FIG. 11.

The communication component 508 can facilitate wireless communication between the UE and other devices, such as between the UE 500 and other UEs via an M2M link and/or between the UE 500 and a wireless communication system network node (e.g., network node 104). The communication component 508 can be or include hardware (e.g., a central processing unit (CPU), one or more transmitters, one or more receivers, one or more transceivers, one or more decoders), software (e.g., a set of threads, a set of processes, software in execution) or a combination of hardware and software that facilitates one or more of the various types of wireless communications described herein. The power source 510 can provide power to the various electrical components of the UE 500 to facilitate operation thereof (e.g., the processor 506, the communication component 508, the IC card 514, etc.). The power source 510 can include, but is not limited to, a battery, a capacitor, a charge pump, a mechanically derived power source (e.g., microelectromechanical systems (MEMs) device), or an induction component.

The IC card 514 can include a fixed or removable integrated circuit chip. The IC card can include memory 516 that stores information and computer executable components or instructions. In the embodiment shown, these computer executable components can include the eDRX retry component 518. In other embodiments, the eDRX retry component 518 (and/or one or more sub-components of the eDRX retry component 518) can be provided in memory 502. In another embodiment, one or more of the eDRX components 504 can be provided in memory 516 of the IC card 514. In some embodiments, the IC card 514 can include a micro-processor 526 to facilitate operation of at least some the instructions stored in the memory 516 (e.g., the eDRX retry component 518). In other embodiments, the UE can be configured to employ processor 506 to execute the instructions stored in memory 516 (e.g., the eDRX retry component 518).

In one or more embodiments, the IC card 514 is a SIM card or a UICC that stores network subscriber data (not shown) that includes network-specific information used to authenticate and identify a subscriber on a wireless communication network (e.g., system 100). The terms SIM card and UICC are used herein interchangeably to refer to an integrated circuit card that provides same or similar features and functionalities when employed in association with a UE that is configured to operate using a wireless communication network. In general, the SIM card and the UICC can contain unique information that identifies a UE to a wireless communication network with which the SIM card or UICC is registered and enables the UE to operate using the wireless communication network. For example, the network subscriber data can include but is not limited to, a unique serial number (ICCID) associated with the subscriber, an IMEI number associated with the subscriber, security authentication and ciphering information, temporary information related to the local network, a list of the services the subscriber has access to, and password information (e.g., a personal identification number (PIN) for ordinary use, and a personal unblocking code (PUK) for PIN unlocking. The UICC is considered a next generation SIM card and has applications beyond GSM networks. In addition to storing network subscriber data, the IC card 514 can include one or more SIM application toolkit (STK) or card application toolkit (CAT) applications that consist of a set of commands programmed into the SIM/UICC card which define how the SIM/UICC should interact directly with the outside world and initiates commands independently of the UE and the network. This enables the SIM/UICC to build up an interactive exchange between a network application and the end user and access or control access to the network. In one or more embodiments, at least one of these STK or CAT applications can be or include the eDRX retry component 518.

In accordance with various embodiments, the eDRX retry component 518 can provide the subject eDRX retry protocol that controls the maximum number of times (N-max) the UE 102 can negotiate UE desired eDRX parameters with the core wireless communication network (via a network device 108 of the core wireless communication network 106, such as an MME device), after the network has previously instructed the UE 102 to use network eDRX parameters that are different from the UE requested eDRX parameters. In some implementations, the eDRX retry component 518 and be enabled or disabled, wherein when enabled, the UE is be configured to execute the eDRX retry protocol (e.g., using micro-processor 526 or processor 506), and wherein when disabled, the UE is be configured to negotiate eDRX parameters without the subject eDRX retry protocol (e.g., according to the protocol defined by the one or more eDRX components 504). For example, the eDRX retry component 518 can include a retry flag that can be set to a first value (e.g., one) to enable the eDRX retry functionality of the eDRX retry component 518 or a second value (e.g., zero) to disable the eDRX retry functionality. In one or more embodiments, the core wireless communication network (e.g., a network device 108 of the core wireless communication network 106) can control enabling and disabling the eDRX retry component 518 using an OTA message.

In various embodiments, the eDRX retry component 518 can include retry tracking component 520, eDRX parameter control component 522, and eDRX parameter information 524. When the eDRX retry component 518 is enabled, the retry tracking component 520 can be configured to track the number of times N the UE sends an attach or TAU request with UE preferred eDRX parameters yet is instructed by the network, via the attach or TAU acceptance message, to employ network eDRX parameters that are different from the UE requested eDRX parameters. The retry tracking component 520 can further store information regarding the number of "failed" eDRX negotiation attempts, N, in memory 516 (e.g., as eDRX parameter information 524). In some implementations, the information regarding the number of failed eDRX negotiation attempts can merely include the tracked number N. In other implementations, the retry tracking component 520 can further store information in memory 516 (e.g., as eDRX parameter information 524), that identifies the specific network provided eDRX parameter values that were applied by the UE in response to the failed eDRX negotiation procedure. The retry tracking component 520 can also store, as eDRX parameter information, information identifying the UE preferred eDRX parameter values that were rejected by the network.

The eDRX parameter control component 522 can be configured to control what eDRX parameters the UE provides in each attach or TAU request. In particular, each time the UE initiates an attach or TAU request, when the eDRX retry component 518 is enabled, the eDRX parameter control component 522 can determine whether the value N (included in the eDRX parameter information 524) is greater than or equal to N-max. The value N-max can also be included in memory 516 (e.g., in the eDRX parameter information 524) and accessible to the eDRX parameter control component 522. In some implementations, the network (e.g., core wireless communication network 106) can set the value N-max. For example, the network can send the UE 500 an OTA message that that directs the UE 500 to set N-Max to a specific value (e.g., 5). In response to a determination that N is less than N-max, the eDRX parameter control component 522 can direct or authorize the UE to include UE preferred eDRX parameter values in the attach/TAU request. However, in response to a determination that N is greater than N-max, the eDRX parameter control component 522 can direct the UE to include, in the attach/TAU request, the network eDRX parameter values that were most recently previously provided to the UE by the network and employed by the UE. Information identifying the most recently previously provided and employed network eDRX parameter values can be stored in memory 516 (e.g., as eDRX parameter information 524).

The retry tracking component 520 can further be configured to reset the count N to a default value (e.g., zero) in response to a UE reset, power recycle, re-boot, enter/exit airplane mode, and the like. In some implementations, the core wireless communication network can also reset the count N to its default value or another value (e.g., using an OTA message). For example, in one implementation, the network may determine that the UE should forgo any possible remaining eDRX parameter negotiation attempts allowed and begin only using the network eDRX parameter values. According to this implementation, the network can send the UE an OTA message that causes the UE to increase N to be greater than the N-Max value or to set the N-Max value to a lower value that is less than the current N value.

In some implementations, the network can also provide the UE with new network eDRX parameter values. For example, the network may respond to a UE attach or TAU request comprising network eDRX parameters with an attach/TAU acceptance message with new network eDRX parameters. According to this implementation, as defined in the 3GGP Release 13 specification, the UE is still required to honor the new network eDRX parameters included in the attach/TAU response. Accordingly, the UE will operate in eDRX mode according to the new network eDRX parameters. In addition, the retry tracking component 520 can include information in the eDRX parameter information 524 identifying the new network eDRX parameters. In the next attach/TAU request, the eDRX parameter control component 522 can direct the UE to employ the new network eDRX parameters if N is greater than or equal to N-max.

Figure 6:
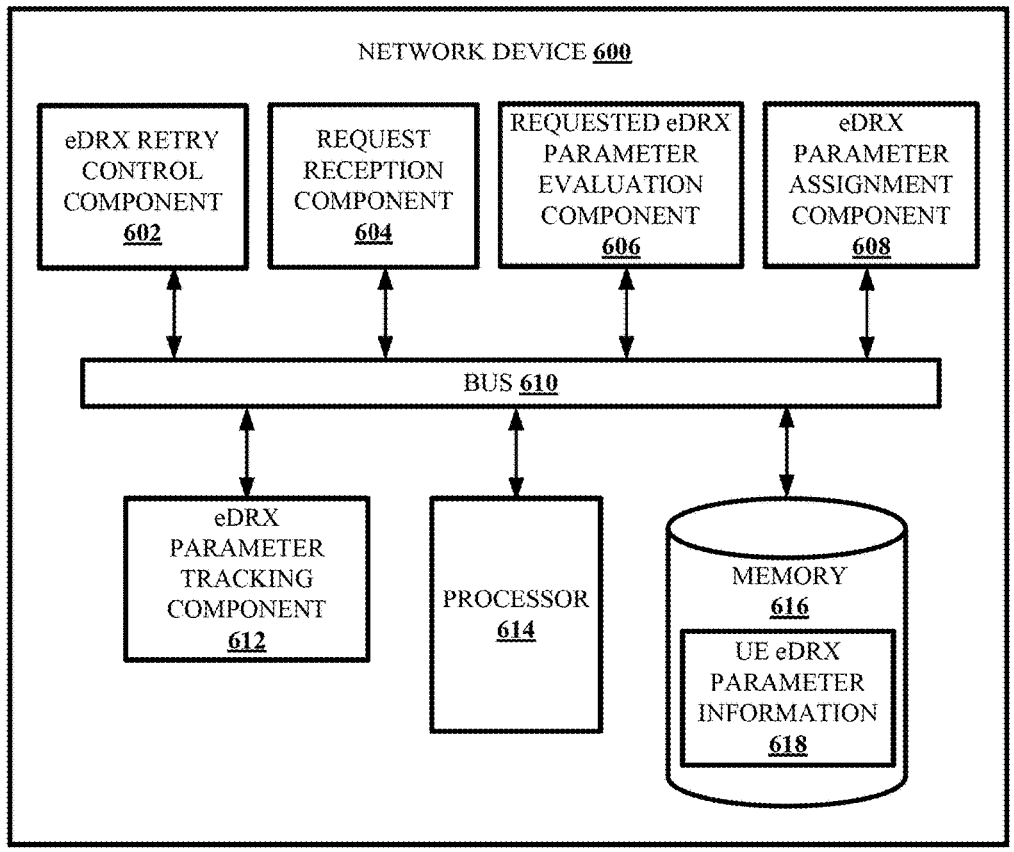
FIG. 6 presents an example network device configured to facilitate managing negotiation of eDRX parameters between a UE the network device in accordance with various aspects and embodiments of the subject disclosure.

FIG. 6 presents an example network device 600 configured to facilitate managing negotiation of eDRX parameters between a UE the network device in accordance with various aspects and embodiments of the subject disclosure. In various embodiments, a network device of the one or more network devices 108 of system 100 can be or include network device 600, or vice versa. In one implementation, the network device 600 is an MME device. Still in other embodiments, one or more components of the network device 600 can be included at the network node (e.g., network node) that connects a UE to the core wireless communication network (e.g., core wireless communication network 106). Repetitive description of like elements employed in respective embodiments is omitted for sake of brevity.

The network device 600 can include various components that facilitate managing negotiation of eDRX parameters between the network device 600 and a UE (e.g., UE 102, UE 500 and the like). These components can include eDRX retry control component 602, request reception component 604, requested eDRX parameter evaluation component 606, eDRX parameter assignment component 608 and eDRX parameter tracking component 612. The network device 600 can include memory to store computer executable components and instructions (e.g., the eDRX retry control component 602, the request reception component 604, the requested eDRX parameter evaluation component 606, the eDRX parameter assignment component 608, and the eDRX parameter tracking component 612). The network device 600 can also include a processor 614 to facilitate operation of the computer executable instructions (e.g., the computer executable components and instructions) by the network device 600. The network device 600 can further include a device bus 610 that couples the various components of the network device, including, but not limited to: the eDRX retry control component 602, the request reception component 604, the requested eDRX parameter evaluation component 606, the eDRX parameter assignment component 608, and the eDRX parameter tracking component 612, the memory 616 and the processor 614. Examples of said processor 614 and memory 616, as well as other suitable computer or computing-based elements that can be employed by the network device 600, can be found with reference to FIG. 11.

In one or more embodiments, the eDRX retry control component 602 can be configured to control various aspects of the eDRX retry control protocol deployed at respective UEs (e.g., on the UE SIM/UICC) serviced by the wireless communication network associated with the network device 600. For example, in some implementations, the eDRX retry control component 602 can control activating/enabling and deactivating/disabling the eDRX retry protocol functionality at respective UEs. In embodiments in which the eDRX retry control protocol functionality is provided on the SIM card or UICC of the UE, the eDRX retry control component 602 can direct the network device 600 to send the UE an OTA message that either activates or deactivates the retry control functionality at the UE (e.g., the eDRX retry component 518). For example, the OTA message can direct the UE either to set an eDRX retry control flag value to zero or one, thereby disabling or enabling the eDRX retry component 518. The eDRX retry control component 602 can also control the threshold value N-Max employed by the UE eDRX retry component (e.g., eDRX retry component 518). For example, in embodiments in which the eDRX retry control protocol functionality is provided on the SIM card or UICC of the UE, the eDRX retry control component 602 can direct the network device 600 to send the UE an OTA message that defines the N-Max value for application by the eDRX retry component (e.g., eDRX retry component 518). In some embodiments, the eDRX retry control component 602 can also control resetting N back to its default value (e.g., zero) or another value.

The request reception component 604 can be configured to receive attach and TAU requests sent by a UE. In response to a determination that an attach or TAU request comprises eDRX parameter values and thus includes a request to enter eDRX mode by the UE, the request reception component 604 can forward the request to the requested eDRX parameter evaluation component 606. The requested eDRX parameter evaluation component 606 can be configured to evaluate eDRX parameters included in a UE attach or TAU request to determine whether to authorize performance of eDRX mode by the UE. Based on a determination the UE is authorized to operate in eDRX mode, the requested eDRX parameter evaluation component 606 can further be configured to determine what eDRX parameter values the UE can apply.

In accordance with one or more embodiments, the network device 600 can store UE eDRX parameter information 618 in memory 616 to facilitate determining what eDRX parameters the UE can apply. For example, the UE eDRX parameter information can include a look-up table that identifies UEs service by the network device 600. The look-up table can also include information that identifies network eDRX parameters that the network has previously determined the UE should apply when operating in eDRX mode. For example, in response to reception of an attach or TAU request from a UE including eDRX parameters, the requested eDRX parameter evaluation component 606 can be configured to examine the UE eDRX parameter information 618 to determine whether the UE is included in the look-up table and whether the UE is associated with network eDRX parameter information.

In implementations in which the UE is included in the look-up table and is associated with network eDRX parameter information, the requested eDRX parameter evaluation component 606 can compare the requested UE eDRX parameter value(s) with the network eDRX parameter values associated with the UE. In response to a determination that the requested UE eDRX parameter values and the network eDRX parameter values are the same, the requested eDRX parameter evaluation component 606 can direct the eDRX parameter assignment component 608 to send the UE an attach or TAU acceptance message including the network eDRX parameter values. However, in response to a determination that the requested UE eDRX parameter values and the network eDRX parameter values are different, the requested eDRX parameter evaluation component 606 can be configured to perform an evaluation process to determine whether to authorize the UE to employ the requested UE eDRX parameter values. For example, the requested eDRX parameter evaluation component 606 determine whether application of the UE eDRX parameter values by the UE is suitable in view of current network load (e.g., or load of the network device 600), current network signal scheduling constraints, and other network related factors.

Based on this evaluation process, in response to a determination by the requested eDRX parameter evaluation component 606 that the UE can employ its requested UE eDRX parameter values, the requested eDRX parameter evaluation component 606 can direct the eDRX parameter assignment component 608 to send the UE an attach or TAU acceptance message including the requested UE eDRX parameter values. However, if the requested eDRX parameter evaluation component 606 determines that the requested UE eDRX parameter values are not appropriate, in one embodiment, the requested eDRX parameter evaluation component 606 can direct the eDRX parameter assignment component 608 to send the UE an attach or TAU acceptance message including the network eDRX parameter values that are defined in the look-up table. In another embodiment, the requested eDRX parameter evaluation component 606 can determine new network eDRX parameter values that the UE should employ in view of current network conditions. According to this embodiment, the requested eDRX parameter evaluation component 606 can direct the eDRX parameter assignment component 608 to send the UE an attach or TAU acceptance message including the new network eDRX parameter values. The eDRX parameter tracking component 612 can further update the look-up table to include the new network eDRX parameter values for the UE.

In implementations in which the UE is not included in the look-up table and/or is not associated with network eDRX parameter information, the requested eDRX parameter evaluation component 606 can be configured to perform the aforementioned evaluation process to determine whether to authorize the UE to use the UE requested eDRX parameter values. According to this implementation, based on the evaluation process, in response to a determination that the UE can employ its requested UE eDRX parameter values, the requested eDRX parameter evaluation component 606 can direct the eDRX parameter assignment component 608 to send the UE an attach or TAU acceptance message including the requested UE eDRX parameter values. The eDRX parameter tracking component 612 can further enter information into the look-up table (e.g., the UE eDRX parameter information 618), associating the UE with the assigned eDRX parameter values. However, if the requested eDRX parameter evaluation component 606 determines that the requested UE eDRX parameter values are not appropriate, the requested eDRX parameter evaluation component 606 can determine network approved eDRX parameter values that the UE should employ in view of current network conditions. According to this embodiment, the requested eDRX parameter evaluation component 606 can direct the eDRX parameter assignment component 608 to send the UE an attach or TAU acceptance message including network eDRX parameter values. The eDRX parameter tracking component 612 can further update the look-up table to include information associating the UE with the network eDRX parameter values.

With the subject configuration, if a UE provides the network device 600 with eDRX parameter values that are the same as those associated with the UE in the UE eDRX parameter information 618 (e.g., the UE provides network eDRX parameter values as opposed to UE preferred eDRX parameter values), the requested eDRX parameter evaluation component 606 does not need to perform an evaluation process to determine whether to authorize the UE requested eDRX parameter values. The eDRX parameter assignment component 608 can simply respond to the attach or TAU request with the same parameters requested by the UE. In one or more additional embodiments, in these scenarios, rather than always responding to the UE with the previously approved network eDRX parameters, the requested eDRX parameter evaluation component 606 can be configured to periodically re-evaluate the network eDRX parameters requested by the UE.

For example, in one embodiment, the requested eDRX parameter evaluation component 606 can be configured to re-evaluate the network eDRX parameters requested by the UE according to a predetermined schedule (e.g., once a day, once a week, etc.). In another example, the requested eDRX evaluation component 606 can be configured to re-evaluate the network eDRX parameters requested by the UE in response to a change in network conditions, such as change in network load relative to a threshold degree of deviation. In another example, the eDRX parameter tracking component 612 can be configured to track the number of times (M) a UE includes network eDRX parameters in an attach or TAU request, thereby causing the eDRX parameter assignment component 608 to automatically respond to the request by including the network eDRX parameters in the attach or TAU response. According to this example, the requested eDRX evaluation component 606 can employ a threshold number (M-max) that limits the number of times the eDRX parameter assignment component 608 can automatically respond with the network eDRX parameter values before re-evaluating the network eDRX parameter values. For example, in association with reception of an attach or TAU request from a UE including network eDRX parameter values, if M is greater than M-max, the requested eDRX parameter evaluation component 606 can be configured to re-evaluate the network eDRX parameters requested by the UE. According to this example, the requested eDRX parameter evaluation component 606 may determine new network eDRX parameter values for the UE, update the look-up table with the new network eDRX parameter values, and direct the eDRX parameter assignment component 608 to send the UE and attach or TAU response with the new network eDRX parameter values.

Figure 7:
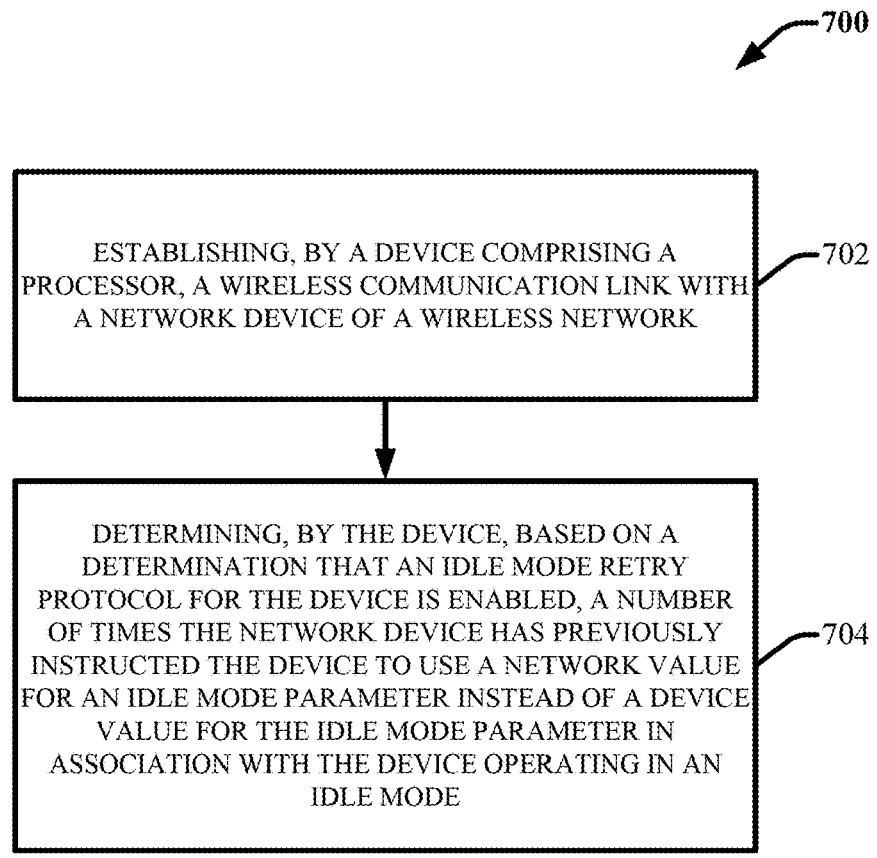
FIG. 7 illustrates another example method for managing negotiation of eDRX parameters between a UE and core network device in accordance with various aspects and embodiments of the subject disclosure.
Figure 8:
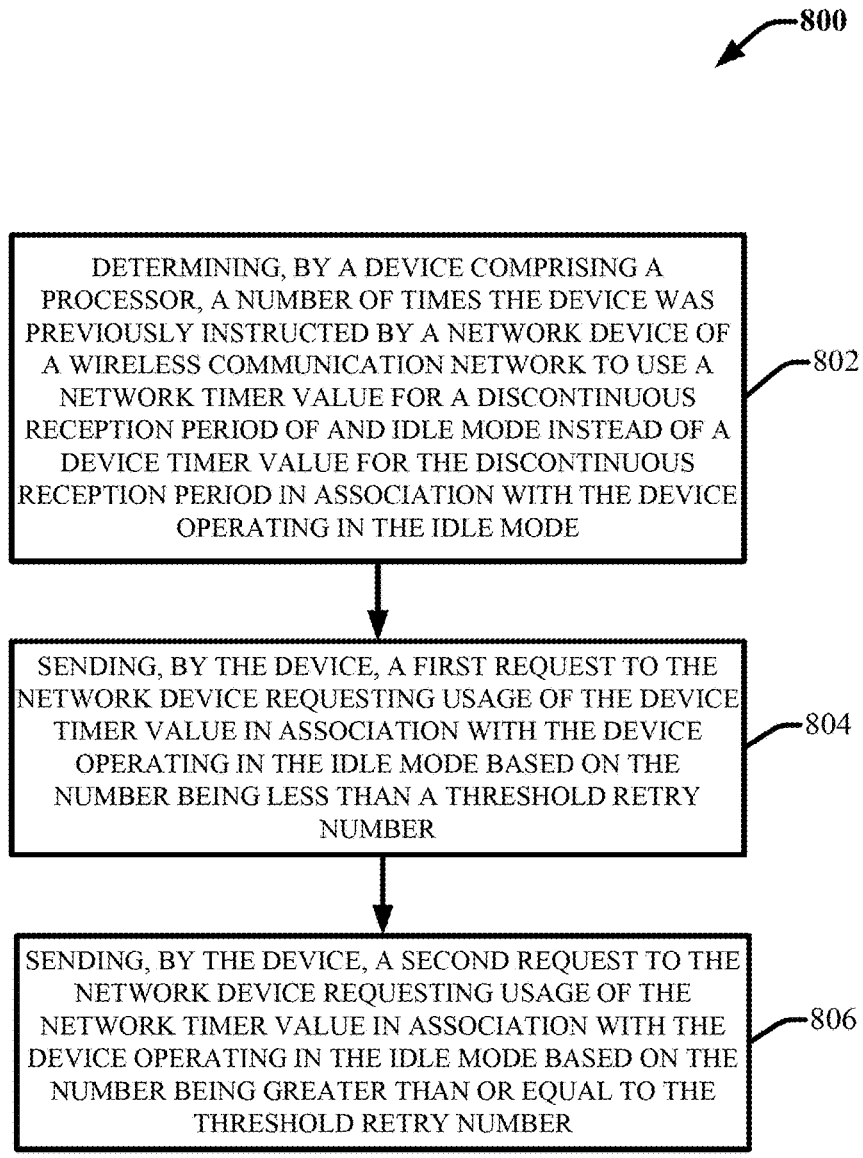
FIG. 8 illustrates another example method for managing negotiation of eDRX parameters between a UE and core network device in accordance with various aspects and embodiments of the subject disclosure.
Figure 9:
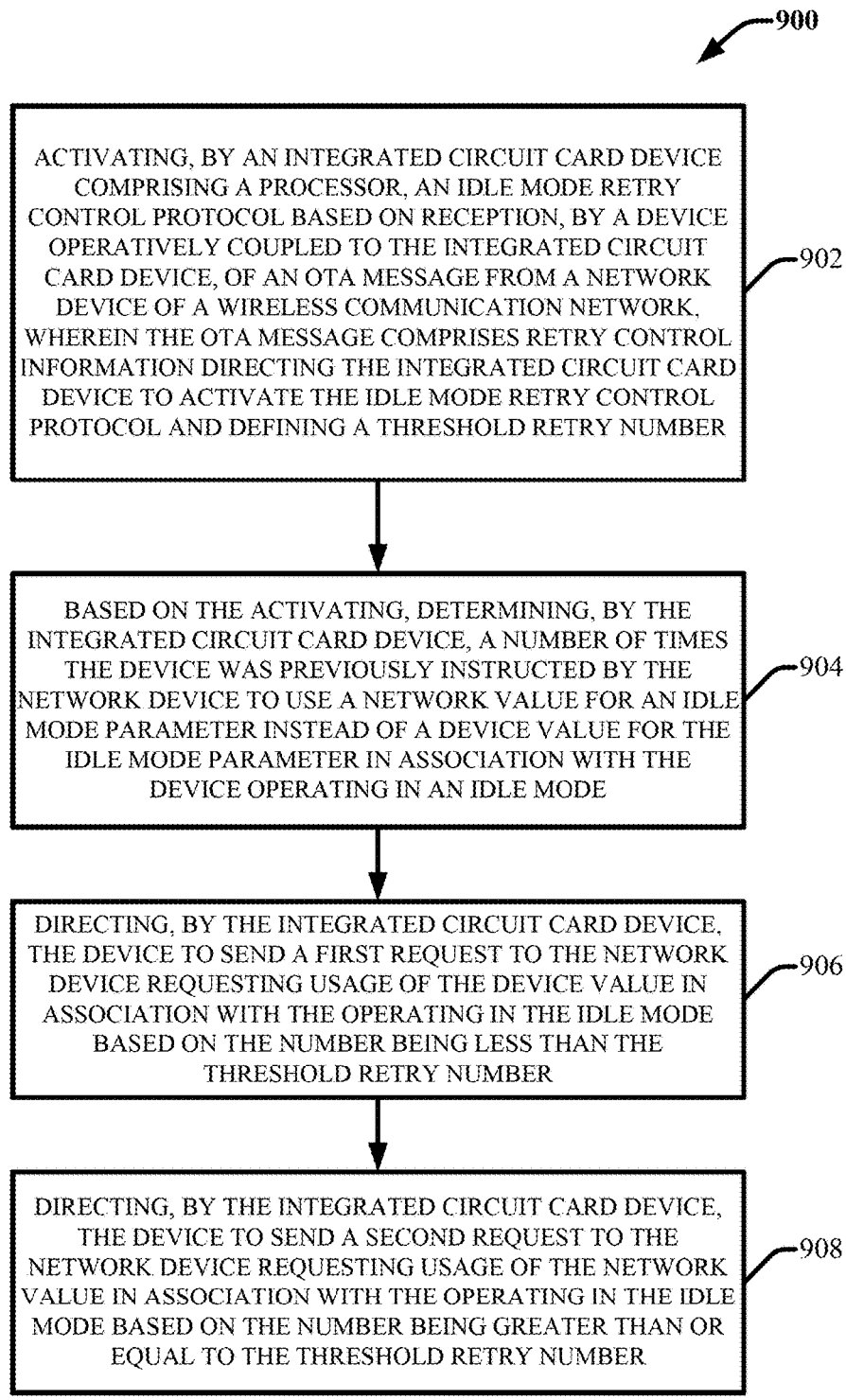
FIG. 9 illustrates another example method for managing negotiation of eDRX parameters between a UE and core network device in accordance with various aspects and embodiments of the subject disclosure.

In view of the example system(s) described above, example method(s) that can be implemented in accordance with the disclosed subject matter can be better appreciated with reference to flowcharts in FIGS. 7-9. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 7 illustrates another example method 700 for managing negotiation of eDRX parameters between a UE and core network device in accordance with various aspects and embodiments of the subject disclosure. Repetitive description of like elements employed in respective embodiments is omitted for sake of brevity.

At 702, a device comprising a processor (e.g., a UE 102, UE 500 or the like), establishes a wireless communication link with a network device of a wireless network. For example, the UE can connect to a core network device (e.g., a network device 108, 600 or the like), via a network node of the wireless communication network in association with performing an attachment procedure or a TAU procedure. At 704, the device determines, based on a determination that an idle mode retry protocol for the device is enabled (e.g., based on enablement of eDRX retry component 518), a number of times (N) the network device has previously instructed the device to use a network value for an idle mode parameter instead of a device value for the idle mode parameter in association with the device operating in an idle mode. For example, the UE can determine a number of times (N) the network device has previously instructed the UE to employ a network eDRX timer as opposed to a UE preferred eDRX timer. In one implementation, if N is less than N-Max, the UE can request usage or the UE preferred eDRX timer in the attachment or TAU request. Otherwise, the UE can be configured to include the previously received network eDRX timer value attachment of TAU request.

FIG. 8 illustrates another example method 800 for managing negotiation of eDRX parameters between a UE and core network device in accordance with various aspects and embodiments of the subject disclosure. Repetitive description of like elements employed in respective embodiments is omitted for sake of brevity.

At 802, a device comprising a processor (e.g., a UE 102, UE 500 or the like), determines a number of times (N) the device was previously instructed by a network device (e.g., a network device 108, network device 600 and the like) of a wireless communication network to use a network timer value for a discontinuous reception period of and idle mode instead of a device timer value for the discontinuous reception period in association with the device operating in the idle mode. At 804, the device sends a first request to the network device requesting usage of the device timer value in association with the device operating in the idle mode based on the number being less than a threshold retry number (N-Max). At 806, the device sends a second request to the network device requesting usage of the network timer value in association with the device operating in the idle mode based on the number being greater than or equal to the threshold retry number.

FIG. 9 illustrates another example method 900 for managing negotiation of eDRX parameters between a UE and core network device in accordance with various aspects and embodiments of the subject disclosure. Repetitive description of like elements employed in respective embodiments is omitted for sake of brevity.

At 902, an integrated circuit card device comprising a processor (e.g., IC card 514), activates an idle mode retry control protocol based on reception, by a device operatively coupled to the integrated circuit card device (e.g., UE 500), of an OTA message from a network device (e.g., network device 108, 600 and the like) of a wireless communication network, wherein the OTA message comprises retry control information directing the integrated circuit card device to activate the idle mode retry control protocol and defining a threshold retry number (N-Max). At 904, based on the activating, the integrated circuit card device determines a number of times the device was previously instructed by the network device to use a network value for an idle mode parameter instead of a device value for the idle mode parameter in association with the device operating in an idle mode. At 906, the integrated circuit card device directs the device to send a first request to the network device requesting usage of the device value in association with the operating in the idle mode based on the number being less than the threshold retry number. At 908, the integrated circuit card device directs the device to send a second request to the network device requesting usage of the network value in association with the operating in the idle mode based on the number being greater than or equal to the threshold retry number.

Figure 10:
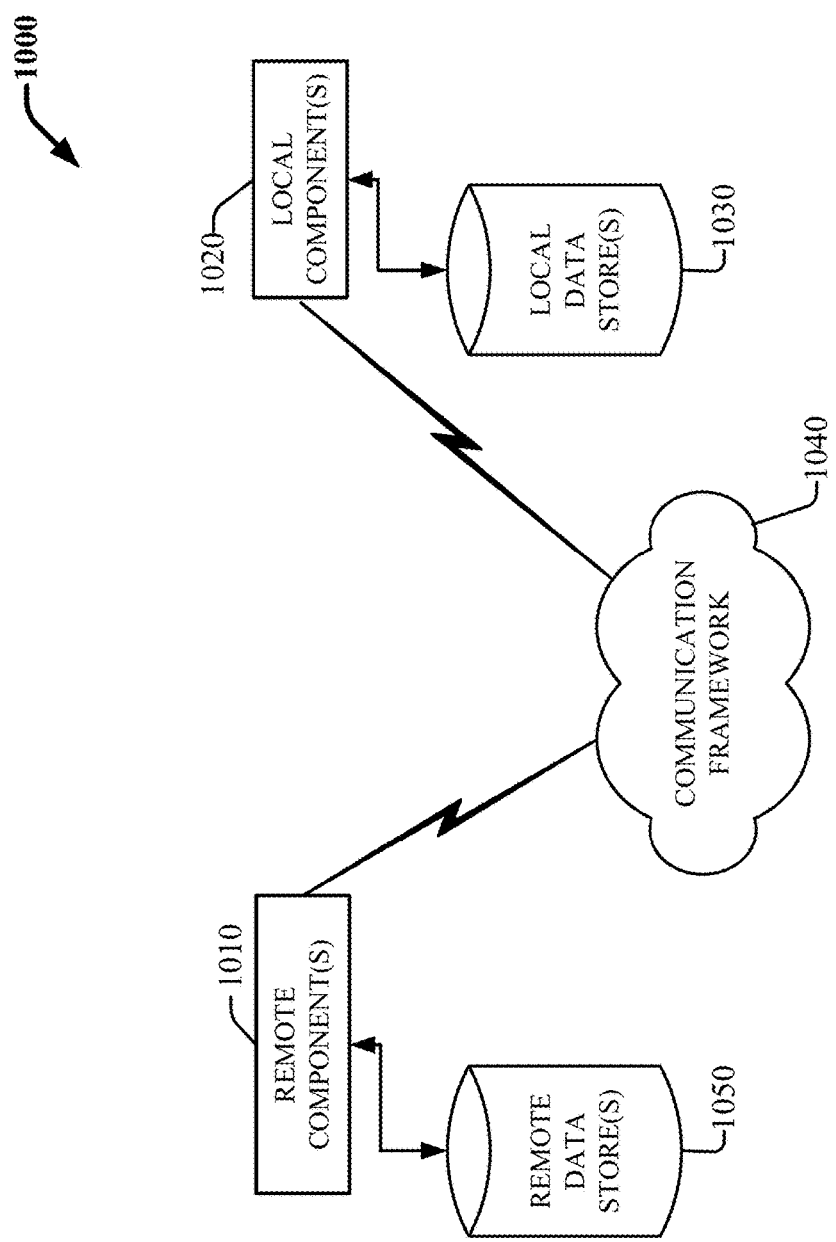
FIG. 10 depicts an example schematic block diagram of a computing environment with which the disclosed subject matter can interact.

FIG. 10 is a schematic block diagram of a computing environment 1000 with which the disclosed subject matter can interact. The system 1000 comprises one or more remote component(s) 1010. The remote component(s) 1010 can be hardware and/or software (e.g., threads, processes, computing devices). In some embodiments, remote component(s) 1010 can comprise servers, personal servers, wireless telecommunication network devices, RAN device(s), etc. As an example, remote component(s) 1010 can be network node 104, network devices 108, network device 600 and the like. The system 1000 also comprises one or more local component(s) 1020. The local component(s) 1020 can be hardware and/or software (e.g., threads, processes, computing devices). In some embodiments, local component(s) 1020 can comprise, for example, UE 102, UE 500, and the like.

One possible communication between a remote component(s) 1010 and a local component(s) 1020 can be in the form of a data packet adapted to be transmitted between two or more computer processes. Another possible communication between a remote component(s) 1010 and a local component(s) 1020 can be in the form of circuit-switched data adapted to be transmitted between two or more computer processes in radio time slots. The system 1000 comprises a communication framework 1040 that can be employed to facilitate communications between the remote component(s) 1010 and the local component(s) 1020, and can comprise an air interface, e.g., Uu interface of a UMTS network, via an LTE network, etc. Remote component(s) 1010 can be operably connected to one or more remote data store(s) 1050, such as a hard drive, solid state drive, SIM card, device memory, etc., that can be employed to store information on the remote component(s) 1010 side of communication framework 1040. Similarly, local component(s) 1020 can be operably connected to one or more local data store(s) 1030, that can be employed to store information on the local component(s) 1020 side of communication framework 1040.

Figure 11:
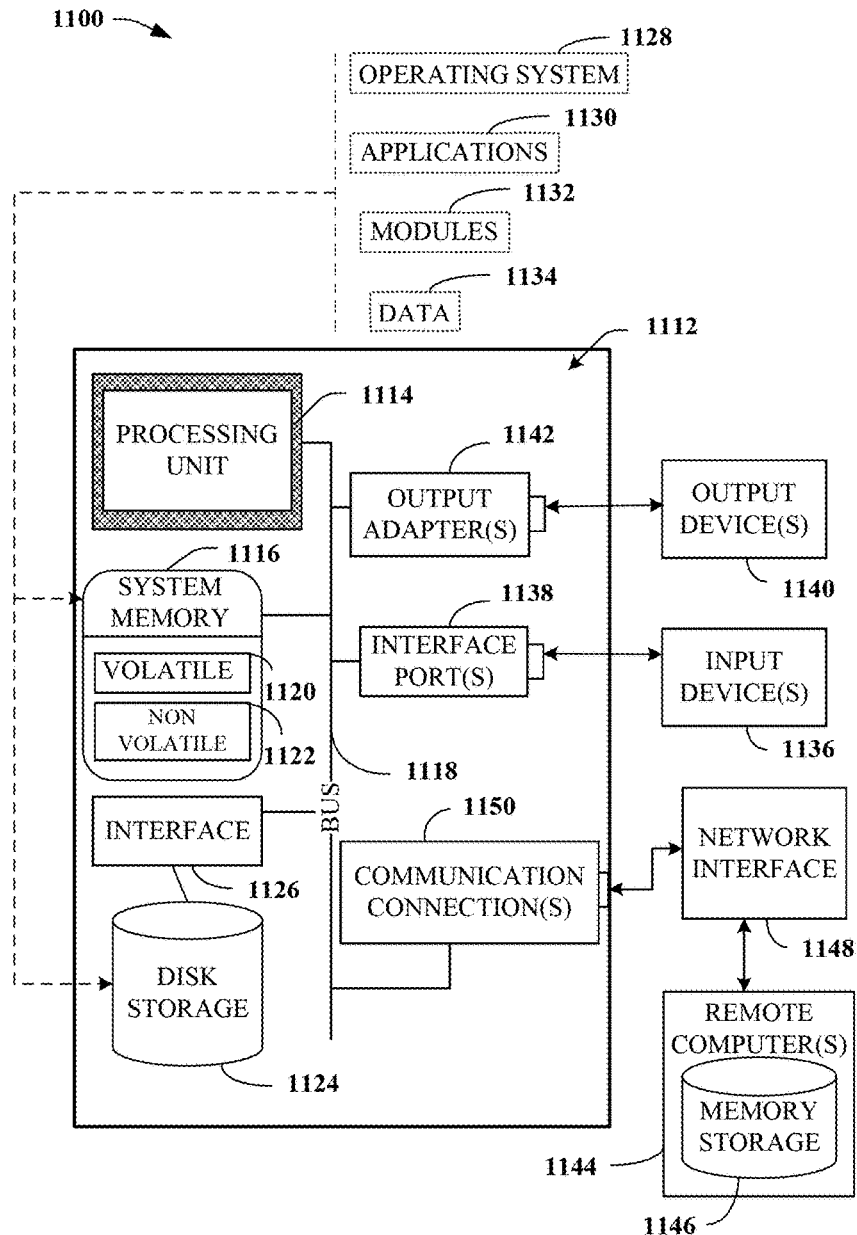
FIG. 11 illustrates an example block diagram of a computing system operable to execute the disclosed systems and methods in accordance with an embodiment.

In order to provide a context for the various aspects of the disclosed subject matter, FIG. 11, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1120 (see below), nonvolatile memory 1122 (see below), disk storage 1124 (see below), and memory storage 1146 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, notebook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 11 illustrates a block diagram of a computing system 1100 operable to execute the disclosed systems and methods in accordance with an embodiment. Computer 1112, which can be, for example, a UE (e.g., UE 102 and 500), a network node (e.g., network node 104), a core network device (e.g., network device 108, network device 600 and the like) comprises a processing unit 1114, a system memory 1116, and a system bus 1118. System bus 1118 couples system components comprising, but not limited to, system memory 1116 to processing unit 1114. Processing unit 1114 can be any of various available processors. Dual microprocessors and other multiprocessor architectures also can be employed as processing unit 1114.

System bus 1118 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 11104), and small computer systems interface.

System memory 1116 can comprise volatile memory 1120 and nonvolatile memory 1122. A basic input/output system, containing routines to transfer information between elements within computer 1112, such as during start-up, can be stored in nonvolatile memory 1122. By way of illustration and not limitation, nonvolatile memory 1122 can comprise read only memory, programmable read only memory, electrically programmable read only memory, electrically erasable read only memory, or flash memory. Volatile memory 1120 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, Synchlink dynamic read only memory, Rambus direct read only memory, direct Rambus dynamic read only memory, and Rambus dynamic read only memory.

Computer 1112 can also comprise removable/non-removable, volatile/non-volatile computer storage media. FIG. 11 illustrates, for example, disk storage 1124. Disk storage 1124 comprises, but is not limited to, devices like a magnetic disk drive, floppy disk drive, tape drive, flash memory card, or memory stick. In addition, disk storage 1124 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1124 to system bus 1118, a removable or non-removable interface is typically used, such as interface 1126.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, cause a system comprising a processor to perform operations, comprising generating an RRC connection release message further comprising alternative band channel data.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 11 describes software that acts as an intermediary between users and computer resources described in suitable operating environment 1100. Such software comprises an operating system 1128. Operating system 1128, which can be stored on disk storage 1124, acts to control and allocate resources of computer system 1112. System applications 1130 take advantage of the management of resources by operating system 1128 through program modules 1132 and program data 1134 stored either in system memory 1116 or on disk storage 1124. It is to be noted that the disclosed subject matter can be implemented with various operating systems or combinations of operating systems.

A user can enter commands or information into computer 1112 through input device(s) 1136. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1112. Input devices 1136 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1114 through system bus 1118 by way of interface port(s) 1138. Interface port(s) 1138 comprise, for example, a serial port, a parallel port, a game port, a universal serial bus, an infrared port, a Bluetooth port, an IP port, or a logical port associated with a wireless service, etc. Output device(s) 1140 use some of the same type of ports as input device(s) 1136.

Thus, for example, a universal serial bus port can be used to provide input to computer 1112 and to output information from computer 1112 to an output device 1140. Output adapter 1142 is provided to illustrate that there are some output devices 1140 like monitors, speakers, and printers, among other output devices 1140, which use special adapters. Output adapters 1142 comprise, by way of illustration and not limitation, video and sound cards that provide means of connection between output device 1140 and system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. Remote computer(s) 1144 can be a personal computer, a server, a router, a network PC, cloud storage, a cloud service, code executing in a cloud-computing environment, a workstation, a microprocessor based appliance, a peer device, or other common network node and the like, and typically comprises many or all of the elements described relative to computer 1112. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can storing and/or processing data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1146 is illustrated with remote computer(s) 1144. Remote computer(s) 1144 is logically connected to computer 1112 through a network interface 1148 and then physically connected by way of communication connection 1150. Network interface 1148 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1150 refer(s) to hardware/software employed to connect network interface 1148 to bus 1118. While communication connection 1150 is shown for illustrative clarity inside computer 1112, it can also be external to computer 1112. The hardware/software for connection to network interface 1148 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "eNodeB," "home Node B," "home access point," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can comprise packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio access network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; third generation partnership project, long term evolution; third generation partnership project universal mobile telecommunications system; third generation partnership project 2, ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced.

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
   establishing, by a device comprising a processor, a wireless communication link with a network device of a wireless network;
   determining, by the device, based on a first determination that an idle mode retry protocol for the device is enabled, a number of times the network device has previously instructed the device to use a network value for an idle mode parameter instead of a device value for the idle mode parameter in association with the device operating in an idle mode; and
   in response to a second determination that the number of times does not exceed a threshold retry number, sending, by the device to the network device, a request to use the device value for the idle mode parameter in association with the device operating in the idle mode.

2. The method of claim 1, wherein the idle mode comprises an extended discontinuous reception idle mode.

3. The method of claim 1, wherein the operating in the idle mode comprises, after disconnecting from the network device, periodically activating a receiver of the device between discontinuous reception periods, wherein the device deactivates the receiver.

4. The method of claim 3, wherein the idle mode parameter controls a duration of the discontinuous reception periods.

5. The method of claim 4, wherein the duration of the discontinuous reception periods is between one millisecond and one hour.

6. The method of claim 1, wherein the sending the request comprises sending an attachment message to the network device via the wireless communication link, and wherein the attachment message comprises the device value for the idle mode parameter.

7. The method of claim 1, wherein the sending the request comprises sending a tracking area update message to the network device via the wireless communication link, and wherein the tracking area update message comprises the device value for the idle mode parameter.

8. The method of claim 1, further comprising:
   in response to a third determination that the number of times exceeds the threshold retry number, sending, by the device to the network device, a request to use the network value for the idle mode parameter in association with the device operating in the idle mode.

9. The method of claim 8, wherein the network value for the idle mode parameter was previously received by the device from the network device in response to a previous request, wherein the previous request was sent by the device to the network device, for authorization to use the device value for the idle mode parameter in association with the device operating in the idle mode, and wherein the device previously employed the network value for the idle mode parameter in association with the device operating in the idle mode.

10. The method of claim 8, wherein the sending the request comprises sending an attachment message to the network device via the wireless communication link, and wherein the attachment message comprises the network value for the idle mode parameter.

11. The method of claim 8, wherein the sending the request comprises sending a tracking area update message to the network device via the wireless communication link, and wherein the tracking area update message comprises the network value for the idle mode parameter.

12. The method of claim 1, further comprising:
   receiving, by the device from the network device via the wireless communication link, retry control information defining a threshold number of times the network device is able to request a first usage of the device value for the idle mode parameter after having been previously instructed to use the network value for the idle mode parameter; and
   determining, by the device, based on a comparison of the number to the threshold number, whether to request the first usage of the device value or a second usage of the network value for the idle mode parameter in association with the device operating in the idle mode.

13. An integrated circuit card device, comprising:
   a processor, and
   a memory that stores executable instructions that, when executed by the processor, facilitate performance of operations, comprising:
      based on a determination that an idle mode retry protocol is enabled, determining a number of times that a device, operatively coupled to the integrated circuit card device, was previously instructed by a network device of a wireless communication network to use a network value for an idle mode parameter instead of a device value for the idle mode parameter in connection with the device operating in an idle mode; and directing the device to send a request to the network device requesting usage of the device value in connection with the operating in the idle mode based on the number being determined to be less than a threshold retry number.

14. The integrated circuit card device of 13, wherein the request is a first request and wherein the operations further, comprise:

directing the device to send a second request to the network device requesting usage of the network value in connection with the operating in the idle mode based on the number being determined to be greater than or equal to the threshold retry number.

15. The integrated circuit card device of 14, wherein the network value for the idle mode parameter was previously received by the device from the network device in response to a previous request, which was sent by the device to the network device, wherein the previous request was for authorization to use the device value for the idle mode parameter in connection with the device operating in the idle mode, and wherein the device previously employed the network value for the idle mode parameter in connection with the device operating in the idle mode.

16. The integrated circuit card device of claim 13, wherein the operations further comprise:

receiving, via an over the air message sent to the device by the network device, retry control information directing the integrated circuit card device to activate the idle mode retry control protocol and defining the threshold retry number;

activating the retry control protocol based on the retry control information; and setting the threshold retry number based on the retry control information.

17. The integrated circuit card device of claim 13, wherein the integrated circuit card device comprises a subscriber identity module card.

18. A machine-readable storage medium, comprising executable instructions that, when executed by a processor of a device, facilitate performance of operations, comprising:

determining a number of times the device was previously instructed by a network device of a wireless communication network to use a network timer value for a discontinuous reception period of an idle mode instead of a device timer value for the discontinuous reception period for when the device is operating in the idle mode; and sending a first request to the network device requesting usage of the device timer value for when the device is operating in the idle mode based on the number being determined to be less than a threshold retry number.

19. The machine-readable storage medium of claim 18, wherein the operations further comprise:

sending a second request to the network device requesting usage of the network timer value for when the device operating in the idle mode based on the number being determined to be greater than or equal to the threshold retry number.

20. The machine-readable storage medium of claim 19, wherein the network timer value was previously received by the device from the network device in response to a previous request, wherein the previous request was sent by the device to the network device for authorization to use the device timer value for the idle mode parameter in association with the device operating in the idle mode, and wherein the device previously employed the network timer value for the idle mode parameter in association with the device operating in the idle mode.

* * * * *